(12) United States Patent
Akasaka et al.

(10) Patent No.: US 9,252,881 B2
(45) Date of Patent: Feb. 2, 2016

(54) AMPLITUDE NOISE SQUEEZING ON MULTI-AMPLITUDE MODULATED SIGNALS

(71) Applicant: Fujitsu Limited, Kanagawa (JP)

(72) Inventors: Youichi Akasaka, Allen, TX (US); Jeng-Yuan Yang, Garland, TX (US)

(73) Assignee: Fujitsu Limited, Kawasaki-shi (JP)

( * ) Notice: Subject to any disclaimer, the term of this patent is extended or adjusted under 35 U.S.C. 154(b) by 309 days.

(21) Appl. No.: 13/907,236

(22) Filed: May 31, 2013

(65) Prior Publication Data

US 2014/0355105 A1  Dec. 4, 2014

(51) Int. Cl.
*G02F 1/39* (2006.01)
*H04B 10/291* (2013.01)
*H04B 10/293* (2013.01)
*H04B 10/299* (2013.01)

(52) U.S. Cl.
CPC ............ *H04B 10/299* (2013.01); *G02F 1/395* (2013.01); *H04B 10/293* (2013.01); *H04B 10/2912* (2013.01); *G02F 2001/392* (2013.01)

(58) Field of Classification Search
CPC ..... G02F 1/39; G02F 1/395; G02F 2001/392; H04B 10/291; H04B 10/2912
See application file for complete search history.

(56) References Cited

U.S. PATENT DOCUMENTS

| | | | |
|---|---|---|---|
| 5,386,314 A | 1/1995 | Jopson | 359/326 |
| 5,400,164 A | 3/1995 | Kurtzke et al. | 398/150 |
| 6,344,921 B1* | 2/2002 | Galvanauskas et al. | 359/332 |
| 6,529,314 B1 | 3/2003 | Shukunami et al. | 359/332 |
| 6,731,424 B1* | 5/2004 | Wu | 359/337.1 |
| 7,164,526 B2 | 1/2007 | McKinstrie et al. | 359/330 |
| 7,304,788 B2 | 12/2007 | McKinstrie | 359/332 |
| 7,369,779 B1 | 5/2008 | Croussore et al. | 398/176 |
| 7,483,203 B2 | 1/2009 | McKinstric | 359/333 |
| 8,032,024 B2 | 10/2011 | Centanni et al. | 398/48 |
| 8,089,689 B1* | 1/2012 | Savage-Leuchs | 359/341.1 |
| 8,098,989 B2 | 1/2012 | Yu | 398/65 |

(Continued)

OTHER PUBLICATIONS

Croussore, All-Optical Regeneration for Phase-Shift Keyed Optical Communication Systems, PhD Thesis, University of Central Florida, 2007.

(Continued)

*Primary Examiner* — Nathan Curs
(74) *Attorney, Agent, or Firm* — Baker Botts L.L.P.

(57) ABSTRACT

A method for regenerating optical signals includes determining an input including a source amplitude-modulated optical signal, regenerating the source amplitude-modulated optical signal by using successive saturation modes of amplification, and producing an output optical signal from the regeneration. The source amplitude-modulated optical signal includes input power modulation levels that each indicate information carried on the source amplitude-modulated optical signal. The output optical signal includes output power modulation levels that include information equivalent to information of the input power modulation levels.

22 Claims, 10 Drawing Sheets

(56) References Cited

U.S. PATENT DOCUMENTS

| | | | |
|---|---|---|---|
| 2009/0190207 A1* | 7/2009 | Watanabe | 359/341.3 |
| 2011/0044692 A1* | 2/2011 | Chan et al. | 398/115 |
| 2011/0176202 A1 | 7/2011 | Kato et al. | 359/337.5 |
| 2013/0087689 A1 | 4/2013 | Woodward et al. | 250/216 |
| 2013/0208334 A1 | 8/2013 | Kakande et al. | 359/246 |
| 2013/0272702 A1 | 10/2013 | Yang et al. | 398/175 |
| 2013/0279528 A1* | 10/2013 | Miesak | 372/18 |
| 2013/0301661 A1 | 11/2013 | Kakande et al. | 370/536 |
| 2014/0119743 A1 | 5/2014 | Yang et al. | 398/175 |

OTHER PUBLICATIONS

Slavik et al, All-optical phase and amplitude regenerator for nextgeneration telecommunications systems, Nat. Photonics, 2010.

Sygletos et al, Phase Locking and Carrier Extraction Schemes for Phase Sensitive Amplification, 2010, Transparent Optical Networks, 2010.

\* cited by examiner

AMPLITUDE NOISE SQUEEZING ON MULTI-AMPLITUDE MODULATED SIGNALS

TECHNICAL FIELD OF THE INVENTION

The present invention relates generally to optical communication networks and, more particularly, to amplitude noise squeezing on multi-amplitude modulated signals.

BACKGROUND

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss. Optical networks often employ modulation schemes to convey information in the optical signals over the optical fibers. Such modulation schemes may include phase-shift keying ("PSK"), frequency-shift keying ("FSK"), amplitude-shift keying ("ASK"), and quadrature amplitude modulation ("QAM").

In PSK, the information carried by the optical signal may be conveyed by modulating the phase of a reference signal, also known as a carrier wave. The information may be conveyed by modulating the phase of the signal itself using differential phase-shift keying ("DPSK").

In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK ("BPSK" or "2-PSK") using two phases at 0° and 180° (or 0 and $\pi$) on the constellation diagram; or quadrature PSK ("QPSK", "4-PSK", or "4-QAM") using four phases at 0°, 90°, 180°, and 270° (or 0, $\pi/2$, $\pi$, and $3\pi/2$). Phases in such signals may be offset. Each of 2-PSK and 4-PSK signals may be arranged in one circle on the constellation diagram.

M-PSK signals may also be polarized using techniques such as dual-polarization QPSK ("DP-QPSK"), wherein separate m-PSK signals are multiplexed by orthogonally polarizing the signals.

SUMMARY

In one embodiment, a system for regenerating optical signals includes an input and a regenerator communicatively coupled to the input. The input is configured to accept a source amplitude-modulated optical signal including input power modulation levels. Each input power modulation level indicates information carried on the source amplitude-modulated optical signal. The regenerator is configured to regenerate the source amplitude-modulated optical signal to produce an output optical signal. The regenerator includes a stage including an optical parametric amplifier configured to apply a saturation mode response to the source amplitude-modulated optical signal and produce a stage output. The regenerator also includes a another stage communicatively coupled in cascaded fashion to the stage and including a optical parametric amplifier configured to apply another saturation mode response to the stage output, and to produce another stage output. The output optical signal is communicatively coupled to the other stage output. The output optical signal includes output power modulation levels including information equivalent to information of the input power modulation levels.

In another embodiment, a method for regenerating optical signals includes determining an input including a source amplitude-modulated optical signal, applying the source amplitude-modulated optical signal to an optical parametric amplifier yielding a stage output, applying the stage output to another optical parametric amplifier yielding another stage output, and producing an output optical signal based upon the other stage output. The source amplitude-modulated optical signal includes input power modulation levels that each indicate information carried on the source amplitude-modulated optical signal. The optical parametric amplifier is configured to optically apply a saturation mode response to the source amplitude-modulated optical signal, yielding the stage output. The other optical parametric amplifier is configured to optically apply another saturation mode response to the stage output, yielding the other stage output. The output optical signal includes output power modulation levels that include information equivalent to information of the input power modulation levels.

In yet another embodiment, a method for regenerating optical signals includes determining an input including a source amplitude-modulated optical signal, regenerating the source amplitude-modulated optical signal by using successive saturation modes of amplification, and producing an output optical signal from the regeneration. The source amplitude-modulated optical signal includes input power modulation levels that each indicate information carried on the source amplitude-modulated optical signal. The output optical signal includes output power modulation levels that include information equivalent to information of the input power modulation levels.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
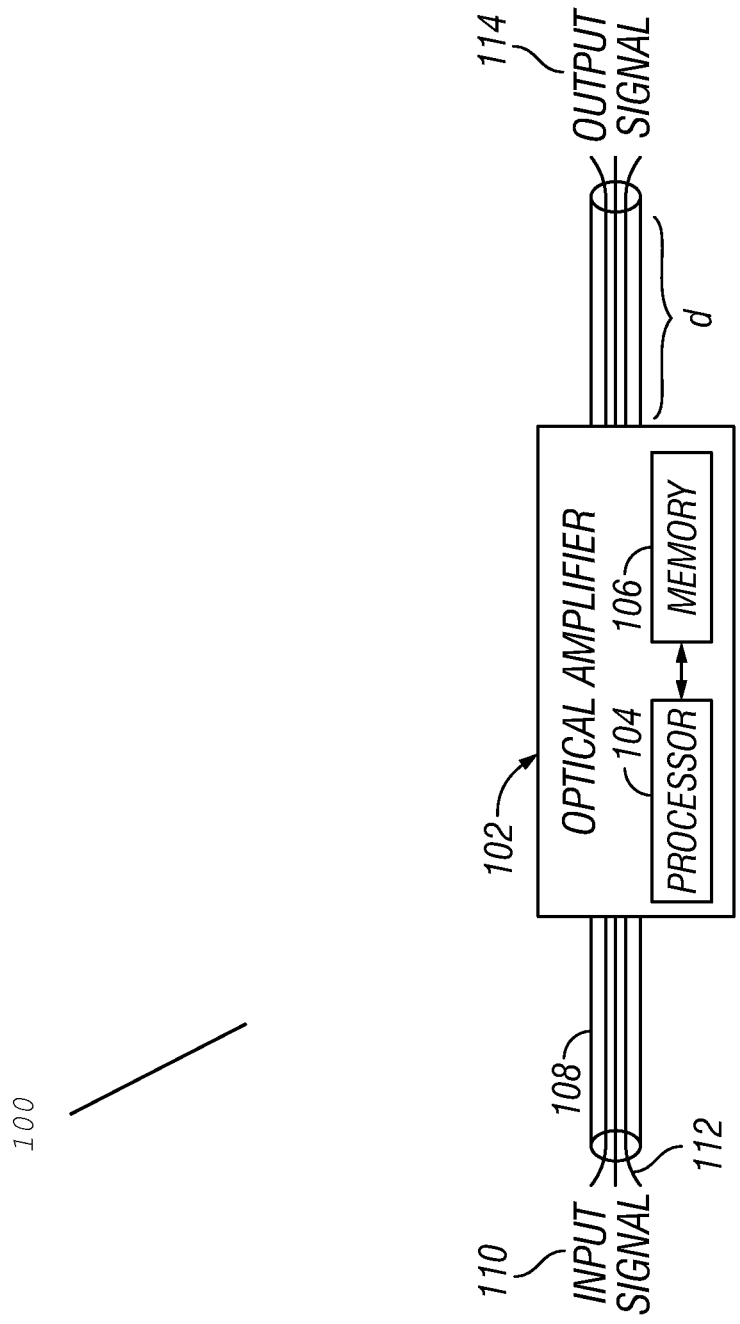
FIG. 1 illustrates an example embodiment of a system configured for amplitude noise squeezing on multi-amplitude modulated signals.

FIG. 1 illustrates an example embodiment of a system 100 configured for amplitude noise squeezing on multi-amplitude modulated signals. In one embodiment, system 100 may include an optical amplifier 102 configured to perform amplitude noise squeezing on multi-amplitude modulated signals. Amplitude modulated signals may include modulations at various power levels, or amplitudes, within the signals. Gaps may exist between such power levels so as to prevent information interference between the signals being modulated at their respective power levels. Noise introduced to an amplitude modulated signal may cause the range of values actually present at such power levels to expand. Such an expanded range of values at a power level may grow until eventually interfering with the information modulated at another power level. Optical amplifier 102 may be configured to squeeze, or reduce, the range of values for a given power level, thus reducing the noise associated with amplitude modulated signals. In various embodiments, optical amplifier 102 may be configured to operate with only optical signal-based components, as opposed to components requiring conversion from optical signals to electrical signals and back to optical signals. Thus, optical amplifier 102 may reduce the number of optical-electrical conversions necessary in system 100.

Optical amplifier 102 may be configured to regenerate and amplify optical signals in system 100. System 100 may include an input signal 110 to be regenerated and amplified as output signal 114 by optical amplifier 102. Signals may be transmitted in system 100 over an optical network 108, which may include one or more optical fibers 112 of any suitable type. System 100 may include optical amplifier 102 in any suitable portion of system 100 or an optical network, such as in a transmission line between two optical components or in a reconfigurable optical add-drop multiplexer. Furthermore, optical amplifier 102 may be configured to operate as a stand-alone device or as part of another piece of optical transmission equipment. Optical amplifier 102 may be placed a distance d from a subsequent piece of optical equipment.

Optical amplifier 102 may include any suitable number and kind of components configured to perform optical signal regeneration and amplification as described herein. Optical amplifier 102 may include a processor 104 coupled to a memory 106. In one embodiment, to perform optical signal regeneration and amplification, optical amplifier 102 may include components for configuring optical amplifier 102 to monitor, adjust, and pre-compensate input signals and other system characteristics such as pump signals to adjust signal information such as phase, power and chromatic dispersion, and to adjust saturation modes of operation.

Optical amplifier 102 may include multiple stages of saturated amplifiers. Each such amplifier stage may be saturated by, for example, adding a pump laser signal to an input signal to match an input signal. Optical amplifier 102 may include any suitable number and kind of stages of saturated amplifiers. Each stage of optical amplifier 102 may amplify the signal using any suitable optical component, such as optical fiber. Each stage of optical amplifier 102 may use, for example, a nonlinear phenomenon in fiber for amplification known as optical parametric amplifier (FOPA).

By applying at least a saturated first stage of optical amplifier 102, input signal 110 may be amplified. However, although input signal 110 may be amplified, the specific components of input signal 110 that contain data encoded with amplitude modulation may be actually increased or decreased in relation to other components of input signal 110. Such a nonlinear change may be due to the saturated aspect of the stage of optical amplifier 102. Furthermore, by applying at least a saturated second stage of optical amplifier 102, input signal 110 may be amplified. However, although input signal 110 may be amplified, the specific components of input signal 110 that contain data encoded with amplitude modulation may be actually increased or decreased in relation to other components of input signal 110. Such a nonlinear change may be due to the saturated aspect of the stage of optical amplifier 102. The combination of the first stage and the second stage of optical amplifier 102 may result in components of an amplitude-modulated signal returning to their original value ranges. However, by applying the saturated aspects of the stages of optical amplifier 102, the noise associated with each such component may be reduced. As such, noise may be illustrated as a spectrum. The reduction of the spread of the noise may be considered a squeeze, or narrowing of the noise range.

Input signal 110 may include an optical signal modulated through any suitable format, such as an amplitude modulation format. For example, input signal 110 may include an 8QAM or 16QAM signal.

Processor 104 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 104 may interpret and/or execute program instructions and/or process data stored in memory 106 to carry out some or all of the operation of optical amplifier 102. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable media). Memory 106 may be non-transitory.

Optical network 108 may include one or more optical fibers 112 operable to transport one or more optical signals communicated by components of the optical network 108. Optical network 108 may be, for example, a point-to-point optical network with terminal nodes, a ring optical network, a mesh optical network, or any other suitable optical network or combination of optical networks. Optical network 108 may be used in a short-haul metropolitan network, a long-haul inter-city network, or any other suitable network or combination of networks. The capacity of optical network 108 may include, for example, 100 Gbps/s/ch, 100 Gbit/s, 400 Gbit/s, or 1 Tbit/s. Optical fibers 112 may include any suitable type of fiber, such as a Single-Mode Fiber ("SMF"), Enhanced Large Effective Area Fiber ("E-LEAF"), or TrueWave® Reduced Slope ("TW-RS") fiber. Optical network 108 may include devices, such as optical amplifier 102, operable to transmit optical signals over optical fibers 112. Information may be transmitted and received through optical network 108 by modulation of one or more wavelengths of light to encode the information on the wavelength.

In operation, optical amplifier 102 may be operating on optical network 108. Input signal 110 may arrive on optical network 108 through fibers 112. Optical amplifier may regenerate and amplify input signal 110 and output the result as output signal 114.

Some methods of regenerating a signal to overcome phase noise may include optical-electrical-optical ("OEO") regeneration methods. Such methods may include, for example, converting optical signals into electronic signals. Such conversion may occur after demultiplexing. The electronic signals may be switched and then converted back into optical signals, which may then be multiplexed onto optical networks. In one embodiment, optical amplifier 102 may not use OEO regeneration methods. In another embodiment, optical amplifier 102 may regenerate a received signal using optical mechanisms and without converting the information in the optical mechanisms to electronic format.

Figure 2:
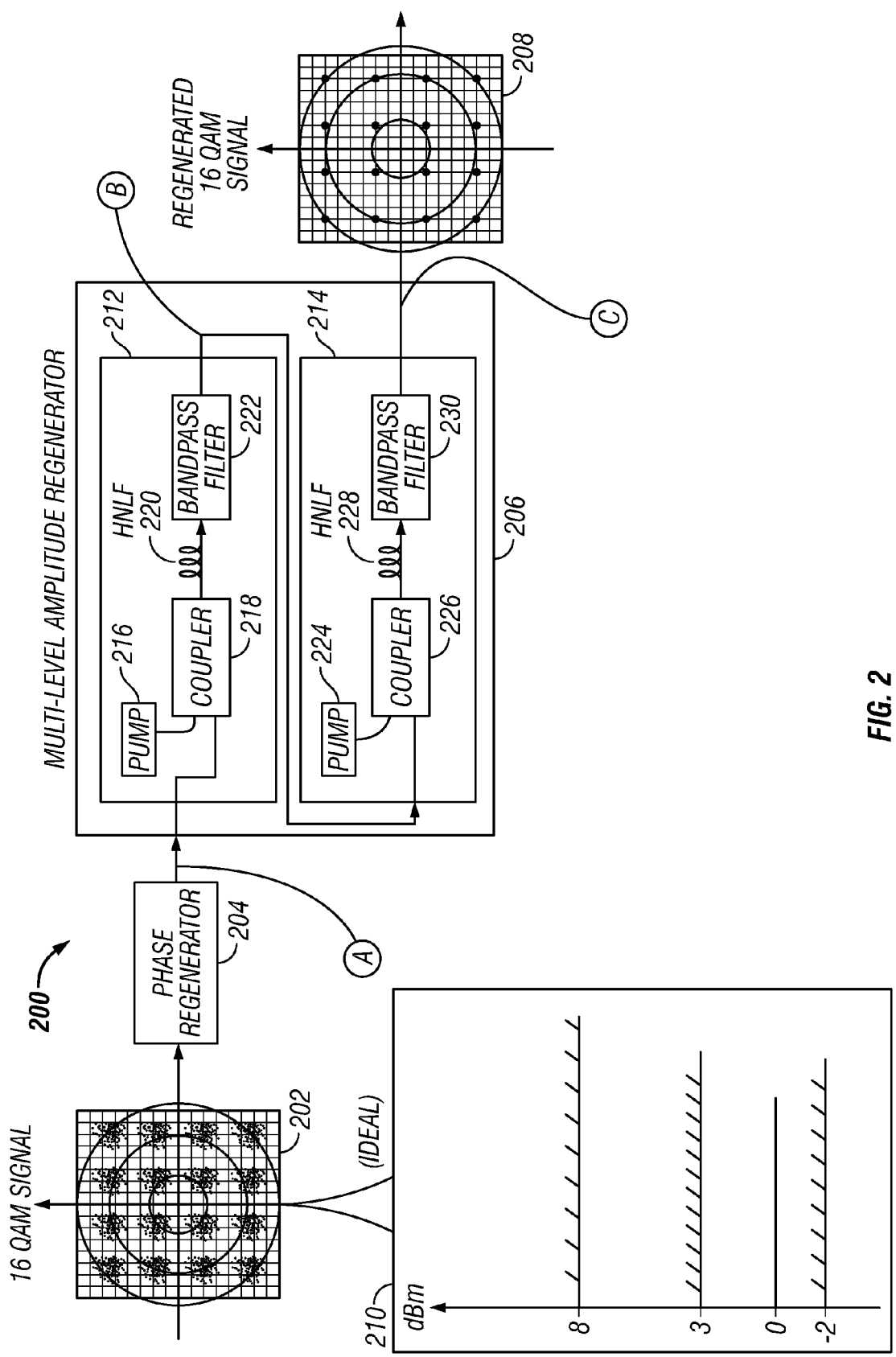
FIG. 2 is an illustration of an example embodiment of an optical amplifier.

FIG. 2 is an illustration of an example embodiment of an optical amplifier 200 for use with a QAM input signal. Optical amplifier 200 may implement fully or in part optical amplifier 102 of FIG. 1.

Optical amplifier 200 may include a mechanism for accepting an input signal such as input 16QAM signal 202. Input 16QAM signal 202 may be communicatively coupled to a phase regenerator 204. Phase regenerator 204 may be communicatively coupled to a multi-level amplitude regenerator 206. Multi-level amplitude regenerator 206 may be configured to output a signal such as an output 16QAM signal 208. In various embodiments, an attenuator or Erbium Doped Fiber Amplifier (EDFA) may be used to match the power of a signal to levels expected by multi-level amplitude regenerator 206. Furthermore, in various other embodiments, such an attenuator or EDFA may be used before any input to a stage of optical amplifier 200 to match the values expected therein.

Although input 16QAM signal 202 is illustrated, another input signal, such as an 8QAM signal, may be used. Input 16QAM signal 202 may include signal components that may be clouded by noise. Example power levels of 16QAM signal 202 may be illustrated in graph 210, showing that, ideally, the information communicated on 16QAM signal 202 may be modulated according to three power levels, such as at −2, 3, and 8 dBm. Accordingly, this may represent an example 3-bit word communicated by 16QAM signal 202. Noise may cause deviation from these power levels. Optical amplifier 200 may be configured to reduce such deviations, or squeeze such deviations, so that the power levels more closely approach the levels illustrated in graph 210.

Input 16QAM signal 202 may be input into phase regenerator 204. Phase regenerator 204 may be implemented in any suitable manner to regenerate phase information of an input signal such as the phase of input 16QAM signal 202. Phase regenerator 204 may conduct such regeneration to eliminate phase noise. However, use of phase regeneration may result in additional amplitude noise. Although FIG. 2 illustrates input 16QAM signal as having noise, such noise with respect to amplitude modulation may be caused in total or in part by phase regenerator 204. The resultant signal may be output to multi-level amplitude regenerator 206.

Multi-level amplitude regenerator 206 may be implemented using at least two amplification stages. The amplification stages may be cascaded. For example, multi-level amplitude regenerator 206 may include a stage 212 communicatively coupled to a stage 214. Each of stages 212, 214 may include an optical amplifier or a portion thereof. Multi-level amplitude regenerator 206 may be configured to operate upon the data power levels of input 16QAM signal 202. To operate upon such data power levels, multi-level amplitude regenerator 206 may be configured to pass input 16QAM signal 202 through cascaded stages 212, 214 that are configured to apply to the data power levels, or resultant data power levels, in a saturation mode.

Figure 3:
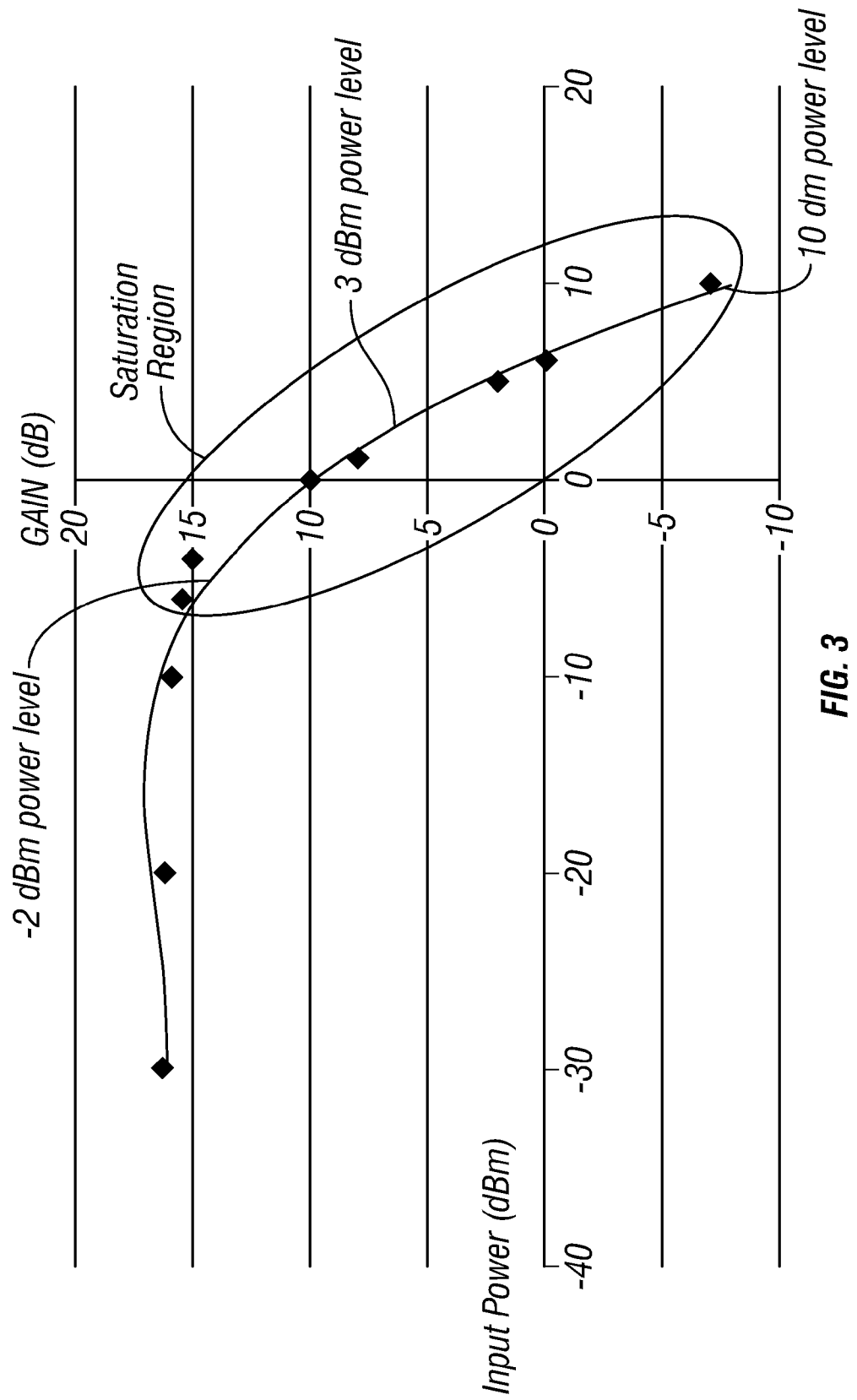
FIG. 3 is an illustration of the response of a stage configured to apply amplification to the power levels of an input signal while in saturation mode.

FIG. 3 is an illustration of the response of stage 212 configured to apply amplification to the power levels of the input signal while in saturation mode. Saturation mode may be the response of stage 212 when its input is so great that the optical amplifier is saturated, and no longer provides a consistent gain as input increases. FIG. 3 illustrates, for an amplifier included in stage 212, the resulting gain for a given power of the input signal. As shown in FIG. 3, in typical usage in other applications the gain of the amplifier in stage 212 is roughly sixteen dB. The typical usage is the range of input signals up to approximately negative four dBm. Accordingly, stage 212 may provide amplification of sixteen dB to input signals, as long as those input signals have less power than negative four dBm. When input signals exceed negative four dBm, the amplifier stage becomes saturated and stops providing the amplification of sixteen dB. Instead, the amplifier begins to rapidly saturate and provide decreasing amounts of amplification as the input power increases, until the amplifier even begins to provide negative amplification after the input rises to approximately six dBm. The saturation region shown in FIG. 3 illustrates for what input power values that stage 212 will stop providing constant amplification and will instead exhibit saturation behavior. The saturation region shown in FIG. 3 may include each of the power levels for which information is amplitude-modulated.

In one embodiment, stage 212 may be configured such that the response of its amplifier is fairly linear and negative during saturation, wherein the input power is plotted against the response. In another embodiment, stage 212 may be configured such that its saturation region covers the power levels of input 16QAM signal 202. The power level spectrum of this saturation region may thus include the input power modulation levels. For example, the x-coordinates of negative two dBm, three dBm, and eight dBm are each within the saturation region. In yet another embodiment, stage 212 may be configured such that at the different power levels of input 16QAM signal 202 are amplified such that the information carried at the respective different power levels will switch positions with respect to one another. For example, the information at the power level corresponding to eight dBm will be de-amplified, as the saturated response at eight dBm is approximately negative five dB. Furthermore, the information at the power level corresponding to negative two dBm will be greatly amplified, as the saturated response at negative two dBm is approximately fifteen dB. Further discussion of the relative amplification of the bits of data is provided below.

Figure 4:
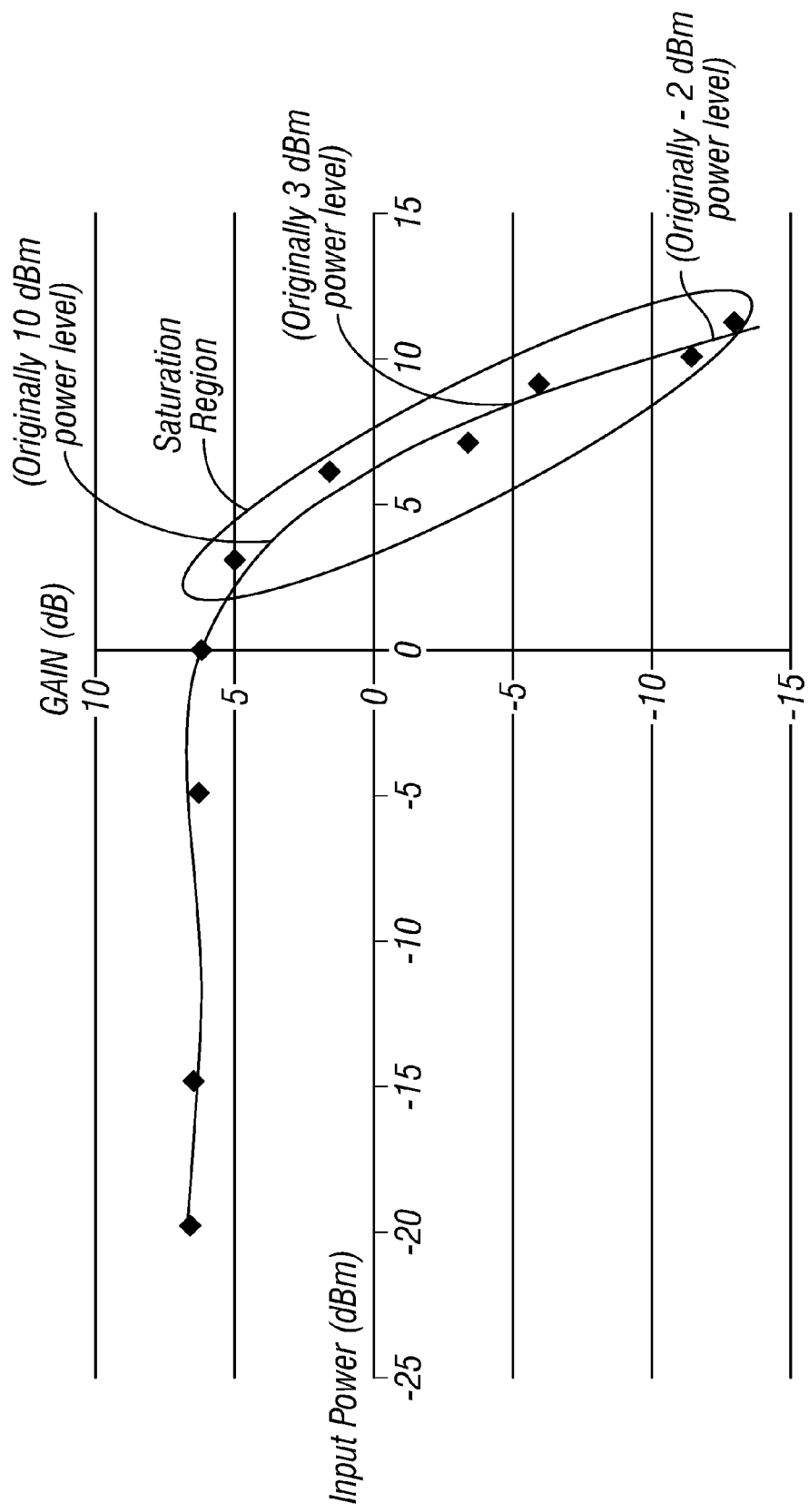
FIG. 4 is an illustration of the response of another stage configured to apply amplification to the power levels of its input signal while in saturation mode.

FIG. 4 is an illustration of the response of stage 214 configured to apply amplification to the power levels of its input signal while in saturation mode. Such input signals may include the output of stage 212 after amplification. FIG. 4 illustrates, for an amplifier included in stage 214, the resulting gain for a given power of its input signal. As shown in FIG. 4, in typical usage in other applications the gain of the amplifier in stage 214 is roughly six dB. The typical usage is the range of input signals up to approximately three dBm. Accordingly, stage 214 may provide amplification of six dB to input signals, as long as those input signals have less power than three dBm. When input signals exceed three dBm, the amplifier stage becomes saturated and stops providing the amplification of six dB. Instead, the amplifier begins to rapidly saturate and provide decreasing amounts of amplification as the input power increases, until the amplifier even begins to provide negative amplification after the input rises to approximately six dBm. The saturation region shown in FIG. 4 illustrates for what input power values that stage 214 will stop providing constant amplification and will instead exhibit saturation behavior.

In one embodiment, stage 214 may be configured such that the response of its amplifier is fairly linear and negative during saturation, wherein the input power is plotted against the response. In another embodiment, stage 214 may be configured such that its saturation region covers the power levels of the output of stage 212. Thus, the power spectrum of the saturation region includes the power levels of the signal input into stage 214. For example, the x-coordinates of three dBm through eleven dBm are all within the saturation region. In yet another embodiment, stage 214 may be configured such that at the different power levels of the output of stage 212 (and thus input of stage 214) amplified such that the information carried at the respective different power levels will again switch positions with respect to one another. For example, the information at the power level corresponding to the original eight dBm information in input 16QAM signal 202—which in stage 214 and FIG. 4 may be approximately five dBm—will be returned to approximately eight dBm, as it is amplified. Furthermore, the information at the power level corresponding to the original three dBm information in input 16QAM signal 202—which in stage 214 and FIG. 4 may be approximately eight dBm—will be returned to approximately three dBm, as it is de-amplified. In addition, the information at the power level corresponding to the original negative two dBm information in input 16QAM signal 202—which in stage 213 and FIG. 4 may be approximately eleven dBm—will be returned to approximately negative two dBm, as it is de-amplified.

Returning to FIG. 2, the result of passing input 16QAM signal 202 through stage 212 and stage 214 may thus be a signal with same power levels as input 16QAM signal 202. However, as stage 212 and stage 214 may be configured to perform parametric amplification, the noise of input 16QAM signal 202 may be reduced. An example output is illustrated as output 16QAM signal 208.

Each stage within multi-level amplitude regenerator 206 may be configured to match input 16QAM signal 202 and the outputs of the other stages such that these will be amplified within the saturation region response of the given stage. Furthermore, each stage may be configured such that output 16QAM signal 208 may include the same power levels as input 16QAM signal 202. Each stage may separately define its own saturation region and slope of amplification, as shown in the examples of FIGS. 3 and 4.

Each stage, such as stage 212 and stage 214, of multi-level amplitude regenerator 206 may be implemented in any suitable manner. In one embodiment, each stage may be implemented with the same or similar components as the other stages, but configured to adjust the magnitude and slope of amplification as well as the saturation region.

For example, stage 212 may include a pump 216 configured to generate a pump signal communicatively coupled to a coupler 218. Coupler 218 may be configured to couple the output of pump 216 and the output of phase regenerator 204. Coupler 218 may be communicatively coupled to a nonlinear element such as a highly nonlinear fiber ("HNLF") 220. Although HNLF 220 is illustrated, any suitable nonlinear optical element may be used. HNLF 220 may include, for example, a length of two hundred meters, nonlinear coefficient ($\gamma$=9.2 (1/W·km)), dispersion slope (S=0.018 ps/km/nm$^2$), and zero-dispersion wavelength ("ZDW") at 1550 nm. In other examples, an optical nonlinear element such as a silicon waveguide, III-V waveguide, or periodically poled Lithium Niobate ("PPLN") may be used. The combination of adding the signal from pump 216 to the input to stage 212 and passing the result through HNLF 220 may be configured to perform the amplification.

Pump 216 may include any suitable mechanism for outputting an optical pump signal of a given wavelength and frequency. Pump 216 may be implemented with configurable laser sources. The configuration of pump 216 may be set by a processor of amplifier 200, such as that represented as processor 104 in FIG. 1. Pump 216 may be configured to respond to the specific kind of input signal received by amplifier 200. In one embodiment, the saturation of stage 212 may be controlled by the power of the signal of pump 216 and by the bandwidth spacing between that of the input to stage 212 and the signal of pump 216. Accordingly, the configuration of pump 216 may differ from other pumps of other stages in amplifier 200, such as those in stage 214. For example, pump 216 may produce a signal with 25 dBm and 500 GHz spacing. In another embodiment, as the power of the signal of pump 216 approaches the power of the input signal, gain of stage 212 may turn negative. The gain rate may be approximately equal to negative one dB per dBm.

The output of HNLF 220 may be communicatively coupled to a bandpass filter 222. Bandpass filter 222 may be implemented in any suitable manner for filtering out any remaining effects or components of the signal of pump 216. The result may be output from stage 212.

The output of stage 212 may be cascaded into other stages of amplifier 200, such as stage 214. Stage 214 may be implemented in a similar fashion to stage 212. Stage 214 may include a pump 224 communicatively coupled to coupler 226, which may combine the output of pump 224 and the input received to stage 214. Couple 226 may be communicatively coupled to an HNLF 228, which may be configured to amplify the combined signals. The output of HNLF 228 may be communicatively coupled to bandpass filter 230, which may be configured to produce output 16QAM signal 208. In one example, pump 224 may be configured to utilize 15 dBm power and 100 GHz spacing.

In FIG. 2, reference points (A), (B), and (C) are marked to provide reference in FIG. 5, below, to illustrate the state of the processing of signals during operation of amplifier 200.

Figure 5:
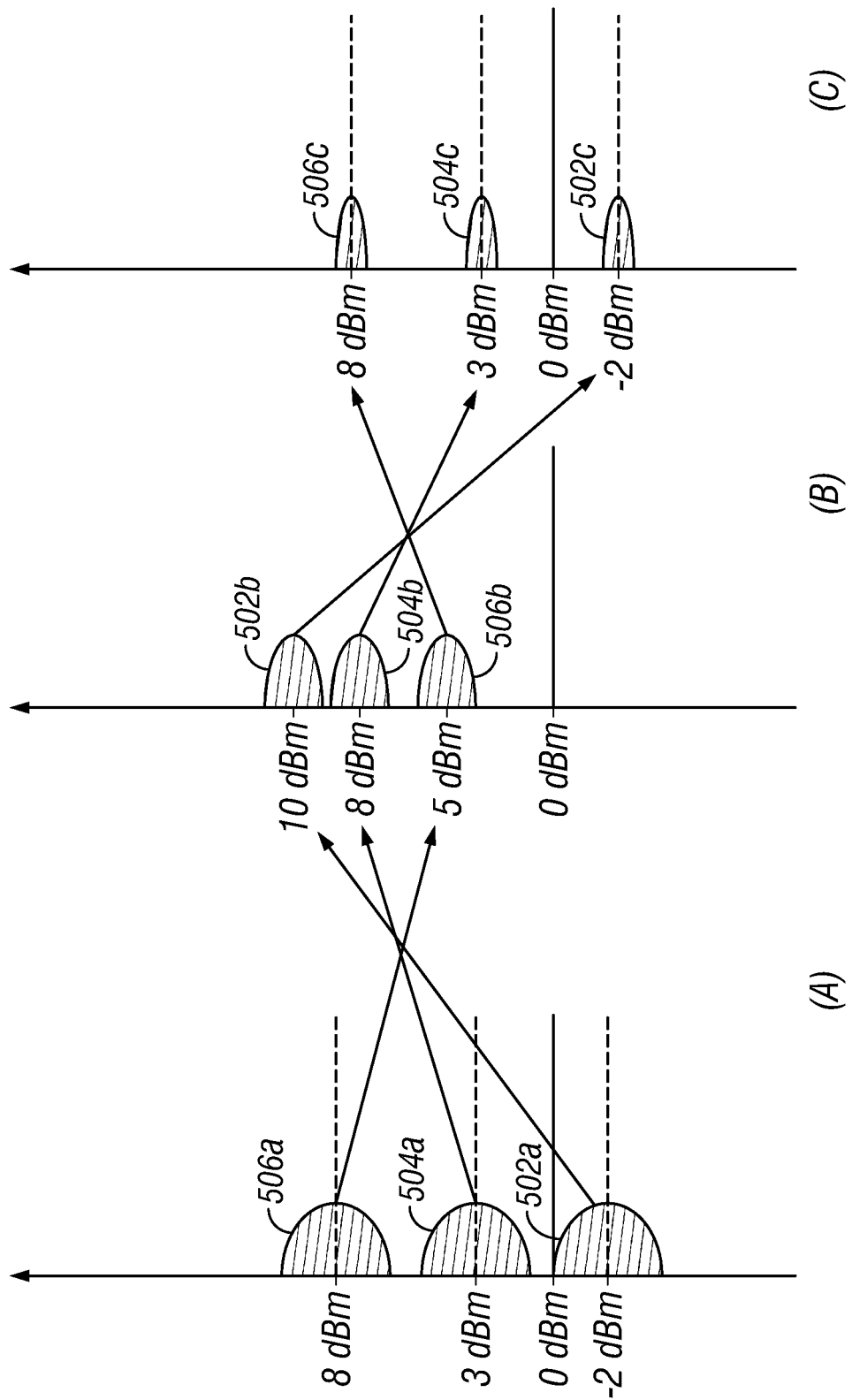
FIG. 5 illustrates example operation of an amplifier for performing amplitude noise squeezing.

FIG. 5 illustrates example operation of amplifier 200 for performing amplitude noise squeezing. In FIG. 5, the power levels of the input signal—in the current example, the three-bit word making up input 16QAM signal 202—are illustrated before entering amplifier 200, after stage 212, and after stage 214.

At (A) in amplifier 200, input 16QAM signal 202 may have been compensated for phase and entered amplifier 200. A first power level 502a is centered around negative two dBm; a second power level 504a is centered around three dBm; and a third power level 506a is centered around eight dBm. As shown in FIG. 5 at (A), each component power level has an associated amount of noise causing fluctuation of the values of each power level. For example, each power level may have a spectrum of plus or minus two dBm. When such fluctuation causes overlap between power levels, errors may occur. Amplifier 200 may be configured to squeeze, or narrow, the noise level.

At (B) in amplifier 200, the output of stage 212 may include the application of the saturation region of stage 212 to input 16QAM signal 202. Accordingly, the power levels of input 16QAM signal 202 may have shifted according to the saturation region's characteristics. Furthermore, the noise level may have been reduced. For example, power level 502a may be been significantly and positively amplified resulting in power level 502b centered at ten dBm. Power level 504a may have been positively amplified to a lesser degree, resulting in power level 504b centered at eight dBm. Power level 506a may have been significantly and negatively amplified, resulting in power level 506b centered at five dBm. After such amplification, noise may have been reduced, wherein each power level includes a spectrum of plus or minus one dBm. Thus, stage 212 may have squeezed, or narrowed, the noise level.

At (C) in amplifier 200, the output of stage 214 may include the application of the saturation region of stage 214 to the output of stage 212. Accordingly, the power levels originally belonging to input 16QAM signal 202 may have again shifted according to the saturation region's characteristics. Furthermore, the noise level may have been reduced. For example, power level 502b may be been significantly and negatively amplified according to FIG. 4, resulting in power level 502c centered at negative two dBm. Power level 504b may have been negatively amplified to a lesser degree, resulting in power level 504c centered at three dBm. Power level 506b may have been significantly and positively amplified, resulting in power level 506c centered at eight dBm. After such amplification, noise may have been reduced, wherein each power level includes a spectrum of plus or minus one-half dBm. Thus, stage 212 may have squeezed, or narrowed, the noise level. Furthermore, the power levels upon output of stage 214 correspond to the power levels of input 16QAM signal 202.

The output of stage 214 may be equivalent to input 16QAM signal 202. In one embodiment, such equivalence may be considered in terms of power levels in comparison to input 16QAM signal 202. In another embodiment, such equivalence may be manifest by the existence of identifiable, distinct power levels at the output that each may be matched to an identifiable, distinct power level at the input.

In the example of FIG. 2, stage 212 and stage 214 are configured to produce a resulting output 16QAM signal 208 that has been regenerated and includes the same power levels as input 16QAM signal 202. Accordingly, output 16QAM signal 208 includes the same data as input 16QAM signal 202 and may be sent to other optical elements. In other examples, the specific values of the power levels upon termination of multi-level amplitude regenerator may not match the specific original power levels. Furthermore, the order of the contents of the power levels may have been reordered. In such examples, amplifier 200 may include or be communicatively coupled to another component to reinterpret or reformat the power levels.

In one embodiment, more than two stages may be used by amplifier 200. In a further embodiment, any suitable number or combination of cascaded stages may be used, provided that the combination of the application of the stages' saturation regions to their respective inputs results in power levels that may by sufficiently differentiated so as to interpret the information carried on the respective power levels. As mentioned above, if the order of the power levels is different before and after amplification by multi-level amplitude regenerator, the relative order of the power levels may be restored before transmission of the output signal. However, if the next entity in an optical network receiving the output signal is aware of a reordering of the power levels, such restoration may be unnecessary. In yet another, further embodiment, any suitable number or combination of cascaded stages may be used, provided that the combination of the application of the stages' saturation regions to their respective inputs results in power levels that are consistent before and after processing by amplifier 200.

The more stages used by amplifier 200, the more difficult the task may be to ensure that the power levels at the output of amplifier 200 match the power levels at the input of amplifier 200. The specific combination of stages, in terms of number of stages and saturation regions of the respective stages, may be determined experimentally according to the specific type of input signal to be regenerated.

Figure 6:
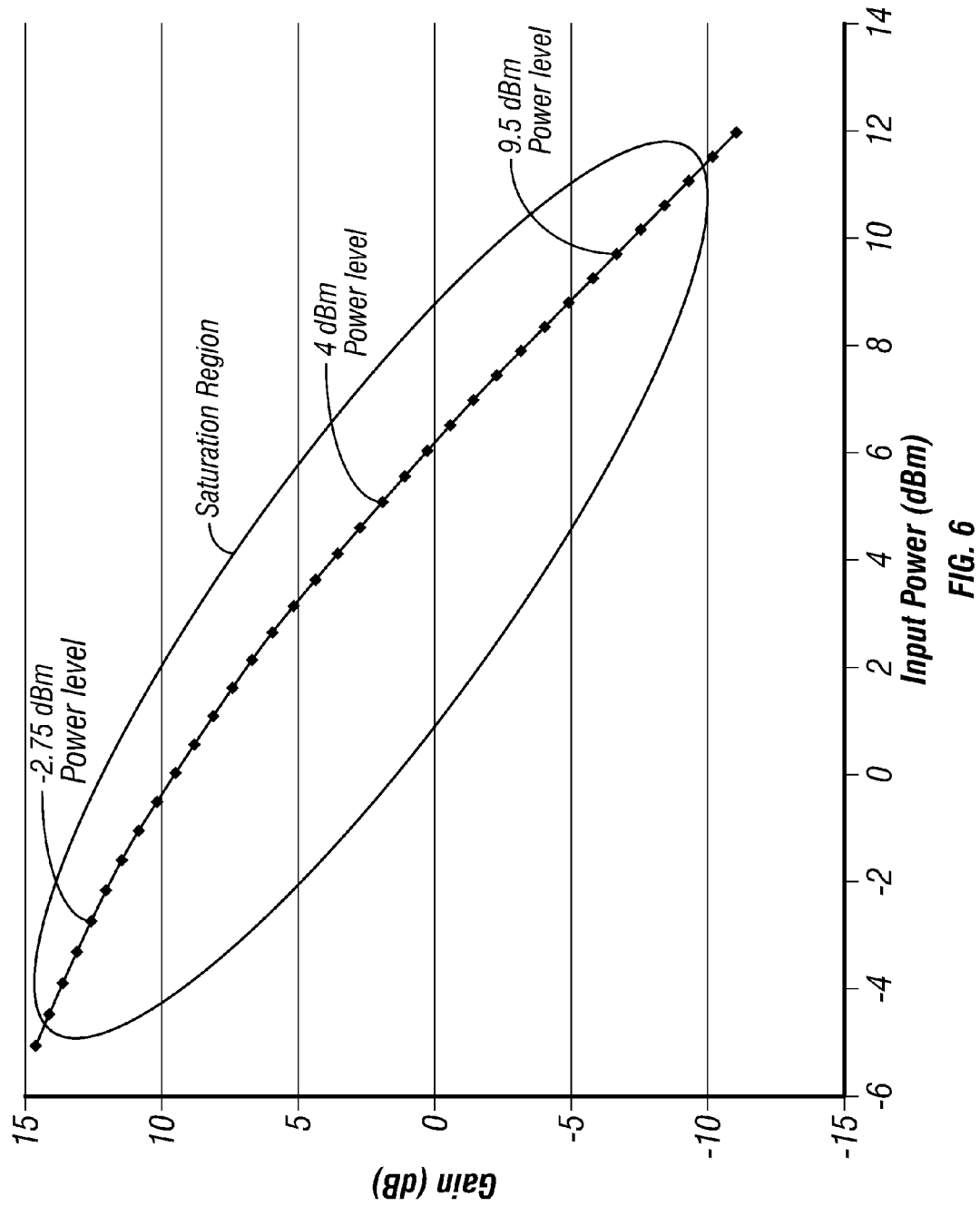
FIG. 6 is an illustration of the response of a first stage of a three-stage amplifier configured to apply amplification to the power levels of an input signal while in saturation mode.
Figure 7:
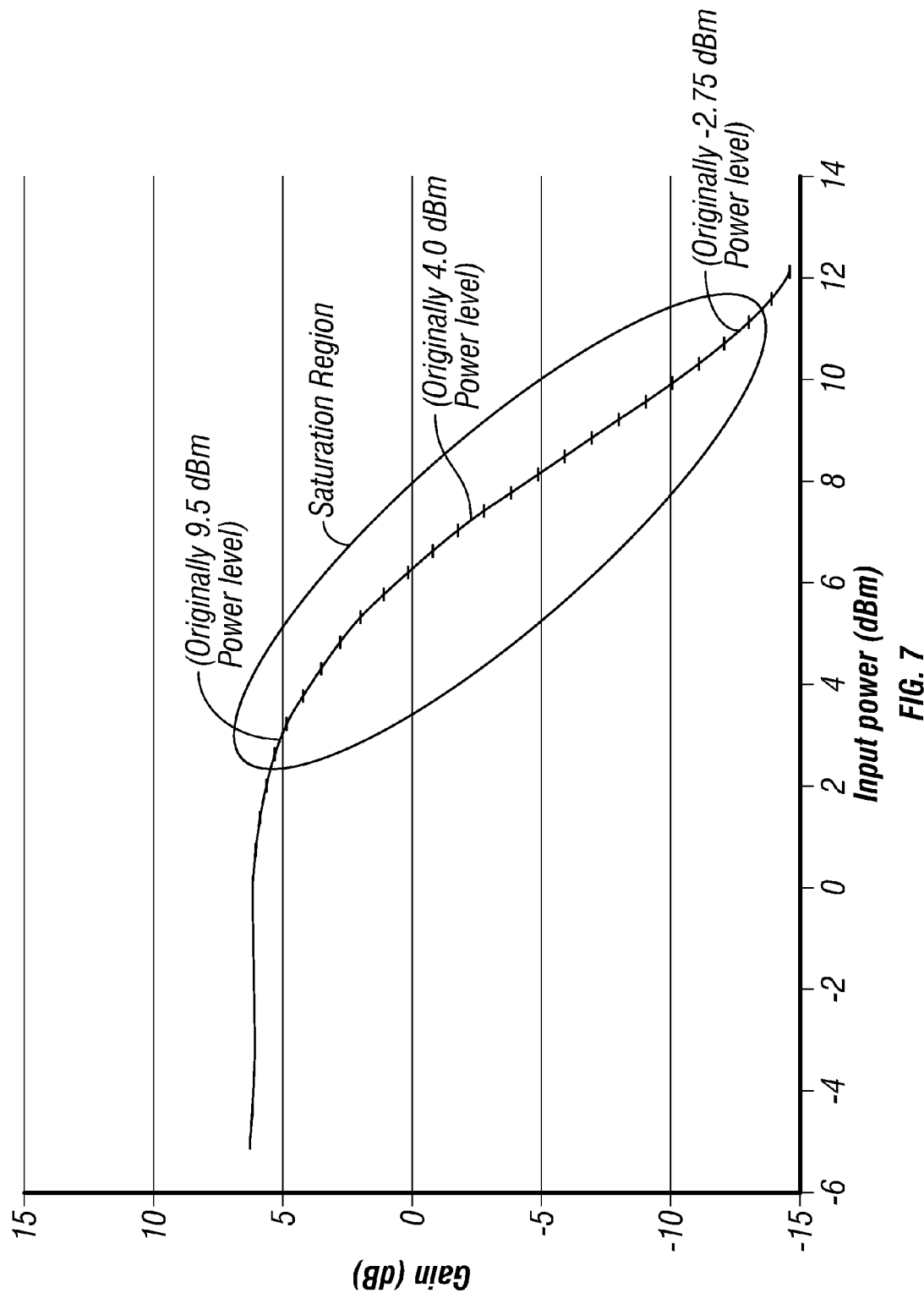
FIG. 7 is an illustration of the response of a second stage of a three-stage amplifier configured to apply amplification to the power levels of its input signal while in saturation mode.
Figure 8:
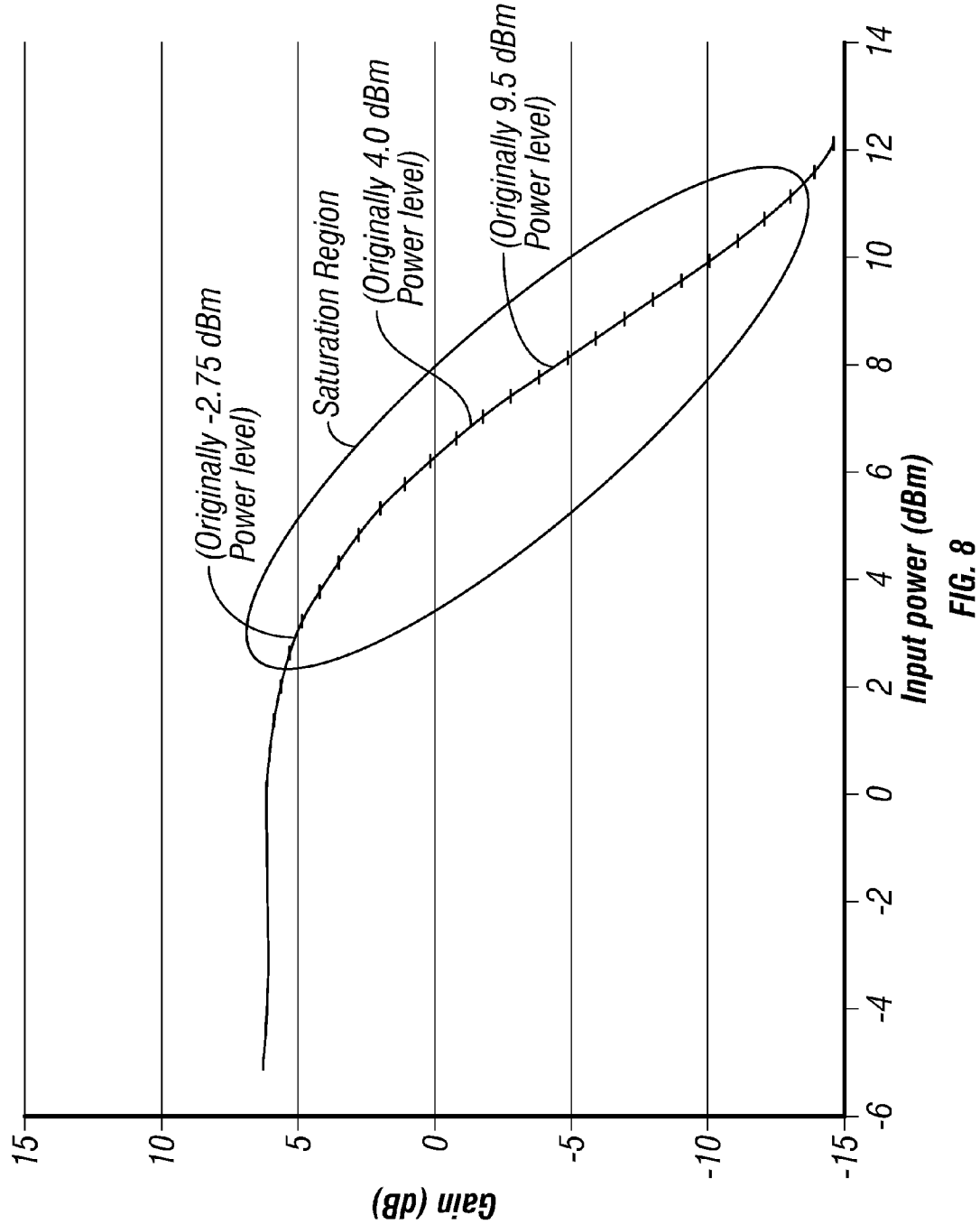
FIG. 8 is an illustration of the response of a third stage of a three-stage amplifier configured to apply amplification to the power levels of its input signal while in saturation mode.

FIGS. 6-8 are illustrations of the example responses of cascaded stages for an embodiment of optical amplifier 102 using three stages. Such stages may be implemented in a manner similar to the manner in which stage 212 or stage 214 are implemented. The input to optical amplifier 102 may be input to the first stage (whose example saturation response is illustrated in FIG. 6). The output of the first stage may be input to the second stage (whose example saturation response is illustrated in FIG. 7). The output of the second stage may be input to the third stage (whose example saturation response is illustrated in FIG. 8). The output of the third stage may be communicatively coupled to the output of optical amplifier 102. Although example saturation responses are illustrated in FIGS. 6-8, any suitable saturation response may be used according to the needs and signals of the optical network in which optical amplifier 102 is utilized. Furthermore, the input signal to optical amplifier 102 may have different power levels than shown in FIG. 2. In the example of FIGS. 6-9, input power levels of 9.5 dBm, 4.0 dBm, and −2.75 dBm may be used for information in the input signal.

FIG. 6 illustrates, for an amplifier included in a first stage of optical amplifier 102, the resulting gain for a given power of the input signal. When input signals exceed negative six dBm, the amplifier stage becomes saturated and stops providing the amplification of its normal gain, and instead the amplifier begins to rapidly saturate and provide decreasing amounts of amplification as the input power increases, until the amplifier even begins to provide negative amplification after the input rises to approximately six dBm. The saturation region shown in FIG. 6 illustrates for what input power values that the first stage will stop providing constant amplification and will instead exhibit saturation behavior. The saturation region shown in FIG. 6 may include each of the power levels for which information is amplitude-modulated.

For example, the x-coordinates of −2.75 dBm, 4.0 dBm, and 9.5 dBm are each within the saturation region. The stage may be configured such that at the different power levels of its input are amplified such that the information carried at the respective different power levels will switch positions with respect to one another. For example, the information at the power level corresponding to 9.5 dBm will be de-amplified, as the saturated response at 9.5 dBm is negative. Furthermore, the information at the power level corresponding to −2.75 dBm will be greatly amplified, as the saturated response at −2.75 two dBm is high.

FIG. 7 is an illustration of the response of a second stage configured to apply amplification to the power levels of its input signal while in saturation mode. Such input signals may include the output of a first stage amplification such as that generated by the saturation response shown in FIG. 6. FIG. 7 illustrates, for an amplifier included in the second stage, the resulting gain for a given power of its input signal. As shown in FIG. 7, in typical usage in other applications the gain of the amplifier in the second stage is roughly six dB. The typical usage is the range of input signals up to approximately three dBm. Accordingly, the stage may provide amplification of six dB to input signals, as long as those input signals have less power than three dBm. When input signals exceed three dBm, the amplifier stage becomes saturated and stops providing the amplification of six dB. Instead, the amplifier begins to rapidly saturate and provide decreasing amounts of amplification as the input power increases, until the amplifier even begins to provide negative amplification after the input rises to approximately six dBm. The saturation region shown in FIG. 7 illustrates for what input power values that the second stage will stop providing constant amplification and will instead exhibit saturation behavior.

In one embodiment, the second stage may be configured such that the response of its amplifier is fairly linear and negative during saturation, wherein the input power is plotted against the response. In another embodiment, the second stage may be configured such that its saturation region covers the power levels of the output of the first stage. Thus, the power spectrum of the saturation region includes the power levels of the signal input into the second stage. For example, the x-coordinates of three dBm through eleven dBm are all within the saturation region. In yet another embodiment, the second stage may be configured such that at the different power levels of the output of the first stage (and thus input of the second stage) are amplified such that the information carried at the respective different power levels will again switch positions with respect to one another. For example, the information at the power level corresponding to the original 9.5 dBm information in the input signal will be presently at approximately 3.2 dBm, wherein it will be amplified. Furthermore, the information at the power level corresponding to the original 4.0 dBm information in the input signal will be presently at approximately 7.7 dBm, wherein it will be amplified, but to a lesser degree than the signal corresponding to the original 9.5 dBm information. In addition, the information at the power level corresponding to the original −2.75 dBm information in the input signal will be presently at approximately 9.9 dBm, wherein it will be deamplified.

FIG. 8 is an illustration of the response of a third stage configured to apply amplification to the power levels of its input signal while in saturation mode. Such input signals may include the output of a second stage amplification such as that generated by the saturation response shown in FIG. 7. FIG. 8 illustrates, for an amplifier included in the third stage, the resulting gain for a given power of its input signal. As shown in FIG. 8, in typical usage in other applications the gain of the amplifier in the third stage is roughly six dB. The typical usage is the range of input signals up to approximately three dBm. Accordingly, the stage may provide amplification of six dB to input signals, as long as those input signals have less power than three dBm. When input signals exceed three dBm, the amplifier stage becomes saturated and stops providing the amplification of six dB. Instead, the amplifier begins to rapidly saturate and provide decreasing amounts of amplification as the input power increases, until the amplifier even begins to provide negative amplification after the input rises to approximately six dBm. The saturation region shown in FIG. 8 illustrates for what input power values that the third stage will stop providing constant amplification and will instead exhibit saturation behavior.

In one embodiment, the third stage may be configured such that the response of its amplifier is fairly linear and negative during saturation, wherein the input power is plotted against the response. In another embodiment, the third stage may be configured such that its saturation region covers the power levels of the output of the second stage. Thus, the power spectrum of the saturation region includes the power levels of the signal input into the third stage. For example, the x-coordinates of three dBm through eleven dBm are all within the saturation region. In yet another embodiment, the third stage may be configured such that at the different power levels of the output of the second stage (and thus input of the third stage) are amplified such that the information carried at the respective different power levels will again switch positions with respect to one another. For example, the information at the power level corresponding to the original 9.5 dBm information in the input signal will be presently at approximately 7.85 dBm, wherein it will be deamplified. Furthermore, the information at the power level corresponding to the original 4.0 dBm information in the input signal will be presently at approximately 3.86 dBm, wherein it will be amplified. In addition, the information at the power level corresponding to the original −2.75 dBm information in the input signal will be presently at approximately −0.22 dBm, wherein it will be amplified and to a greater degree than the power level corresponding to the original −2.75 dBm information.

Each stage may be configured to perform parametric amplification and squeezing of the noise of its input signals to varying degrees. In some cases, amplification of a single, individual stage may result in higher noise in the output when compared to the input of the stage. Accordingly, the number and kind of stages may be selected such that, across all of the cascaded stages, noise may be reduced.

Figure 9:
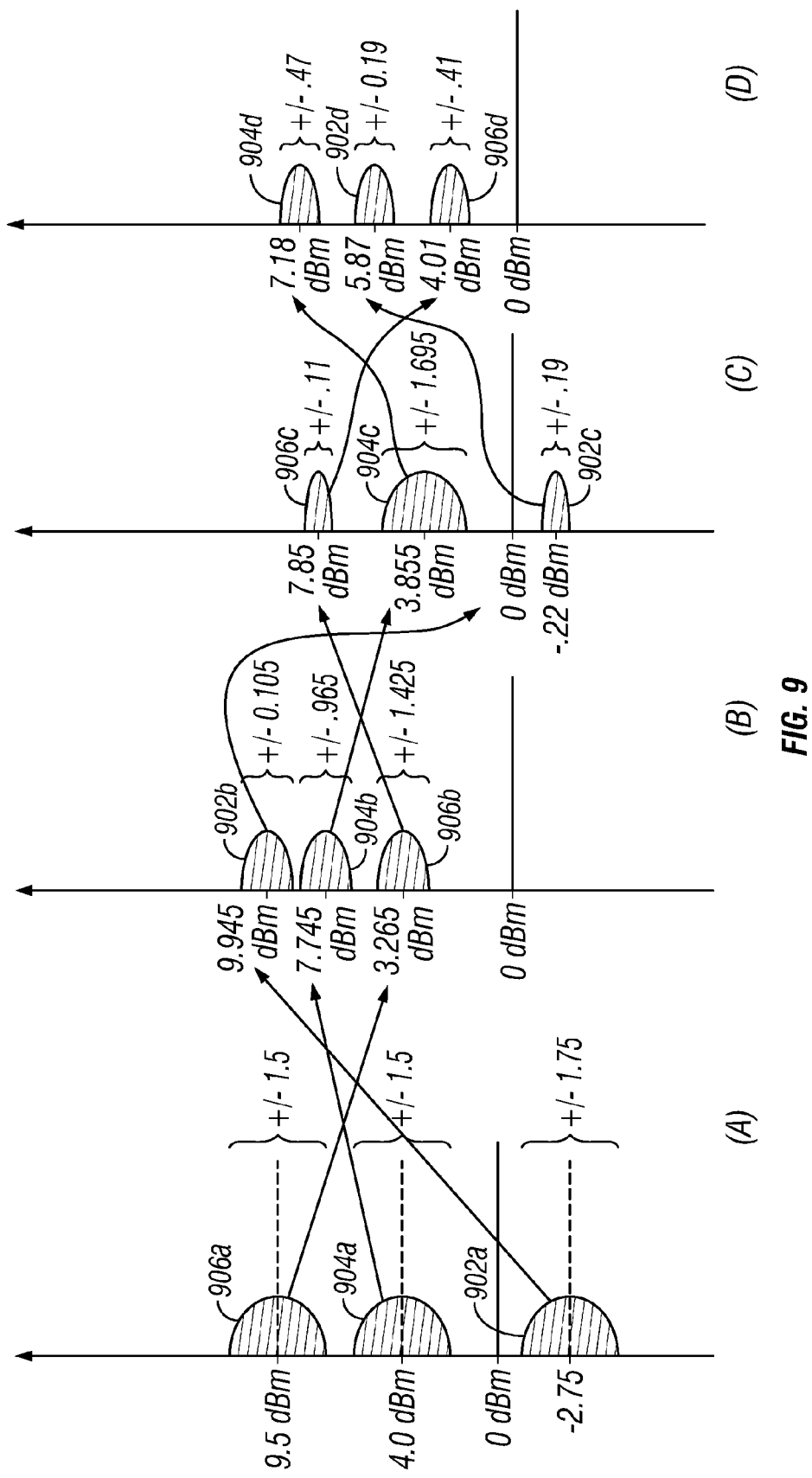
FIG. 9 illustrates example operation of a three-stage amplifier for performing amplitude noise squeezing.

FIG. 9 illustrates example operation of a three-stage amplifier for performing amplitude noise squeezing. The three stages may use the saturation modes illustrated in FIGS. 6-8. In FIG. 9, the power levels of the input signal—such as a three-bit word making up a 16QAM signal—are illustrated before entering the three-stage amplifier at (A), after a first stage (B), after a second stage (C), and after a third stage (D).

At (A), an input signal may have been compensated for phase and entered the three-stage optical amplifier. A first power level 902a is centered around −2.75 dBm; a second power level 904a is centered around 4.0 dBm; and a third power level 906a is centered around 9.5 dBm. As shown in FIG. 9 at (A), each component power level has an associated amount of noise causing fluctuation of the values of each power level. For example, power levels 906a and 904a may have a spectrum of plus or minus 1.5 dBm and power level 902a may have a spectrum of plus or minus 1.75 dBm. When such fluctuation causes overlap between power levels, errors may occur. Amplifier 200 may be configured to squeeze, or narrow, the noise level.

At (B), the output of the first stage may include the application of the saturation region of the first stage to the input signal. Accordingly, the power levels of the input signal as output from the first stage may have shifted according to the saturation region's characteristics. Furthermore, the noise level may have been reduced, depending upon the specific power level and the configuration of the stage. For example, power level 902a may be been significantly and positively amplified resulting in power level 902b centered at approximately 9.945 dBm. Power level 904a may have been positively amplified to a lesser degree, resulting in power level 904b centered at approximately 7.745 dBm. Power level 906a may have been significantly and negatively amplified, resulting in power level 906b centered at approximately 3.265 dBm. After such amplification, noise may have been reduced for one or more of the power levels. Thus, the first stage may have squeezed, or narrowed, the noise level. The actual reduction in noise, if any, may be dependent upon the specific power level and the configuration of amplifiers within the stage. For example, for power level 902a, the noise may have been reduced from a +/−1.75 dBm range to a +/−0.105 dBm range. For power level 904a, the noise may have been reduced from a +/−1.55 dBm range to a +/−0.965 dBm range. For power level 906a, the noise may have been reduced from a +/−1.5 dBm range to a +/−1.425 range.

At (C), the output of the second stage may include the application of the saturation region of the second stage to the output of the first stage. Accordingly, the power levels originally belonging to the input signal may have again shifted according to the saturation region's characteristics. Furthermore, the noise level may have been reduced, depending upon the specific power level and the amplification characteristics of the stage. However, the noise level may have increased. For example, power level 902b may be been significantly and negatively amplified, resulting in power level 902c centered at approximately −0.22 dBm. Power level 904b may have been negatively amplified to a lesser degree, resulting in power level 904c centered at approximately 3.855 dBm. Power level 906b may have been significantly and positively amplified, resulting in power level 906c centered at approximately 7.85 dBm. The second stage may have squeezed, or narrowed, the noise level for some power levels but raised it for others. For example, for power level 906c, the noise may have been reduced from a +/−1.425 dBm range to a +/−0.11 dBm range. For power level 904c, the noise may have increased to +/−1.695 dBm range from a +/−0.965 dBm range. For power level 902c, the noise may have increased to a +/−0.19 dBm range from a +/−0.105 dBm range. However, this level of noise for power level 902c may still be acceptable.

The output of the second stage may contain information equivalent to the input to the three-stage amplifier. However, the noise of power level 904c may be unacceptably high. Accordingly, the output of the second stage may be input to the third stage to squeeze the noise of power level 904c. While the noise of other power levels may increase, so long as all power levels of the signal are below a maximum threshold, such an increase may be acceptable in view of the reduction to the noise for power level 904c.

At (D), the output of the third stage may include the application of the saturation region of the third stage to the output of the second stage. Accordingly, the power levels originally belonging to the input signal may have again shifted according to the saturation region's characteristics. Furthermore, the noise level may have been reduced, depending upon the specific power level and the amplification characteristics of the stage. However, the noise level may have increased. For example, power level 902c may be been amplified, resulting in power level 902d centered at approximately 5.87 dBm. Power level 904c may have been amplified, resulting in power level 904d centered at approximately 7.18 dBm. Power level 906c may have been deamplified, resulting in power level 906d centered at approximately 4.01 dBm. The third stage may have squeezed, or narrowed, the noise level for some power levels but raised it for others. For example, for power level 906d, the noise may have been increased from a +/−0.11 dBm range to a +/−0.41 dBm range. However, this level of noise may still be acceptable. For power level 904d, the noise may have decreased to a +/−0.47 dBm range from a +/−1.695 dBm range. For power level 902d, the noise may have maintained a +/−0.19 dBm range. Thus, after saturation mode amplification of the third stage, all power levels may have a noise level of less than +/−0.47 dBm. Such a noise level may be below a minimally acceptable threshold.

The output of the third stage may contain information equivalent to the input to the three-stage amplifier. Such equivalence may be manifest by the existence of identifiable, distinct power levels at the output that each may be matched to an identifiable, distinct power level at the input. However, in the example of FIG. 9, the output power levels 902d, 904d, 906d may have a different order and a different value than their equivalent input power levels 902a, 904a, 906a. Nevertheless, the order and the power levels of the output of the third stage may be understood and utilized as the three-stage amplifier is used within an optical network. The recipient of the output, such as another network entity, may be configured to accept and correctly interpret the information at the power levels and in the order shown at (D). Furthermore, additional optical or electro-optical equipment may be used to adjust the bit order or the value of the power levels as desired.

Figure 10:
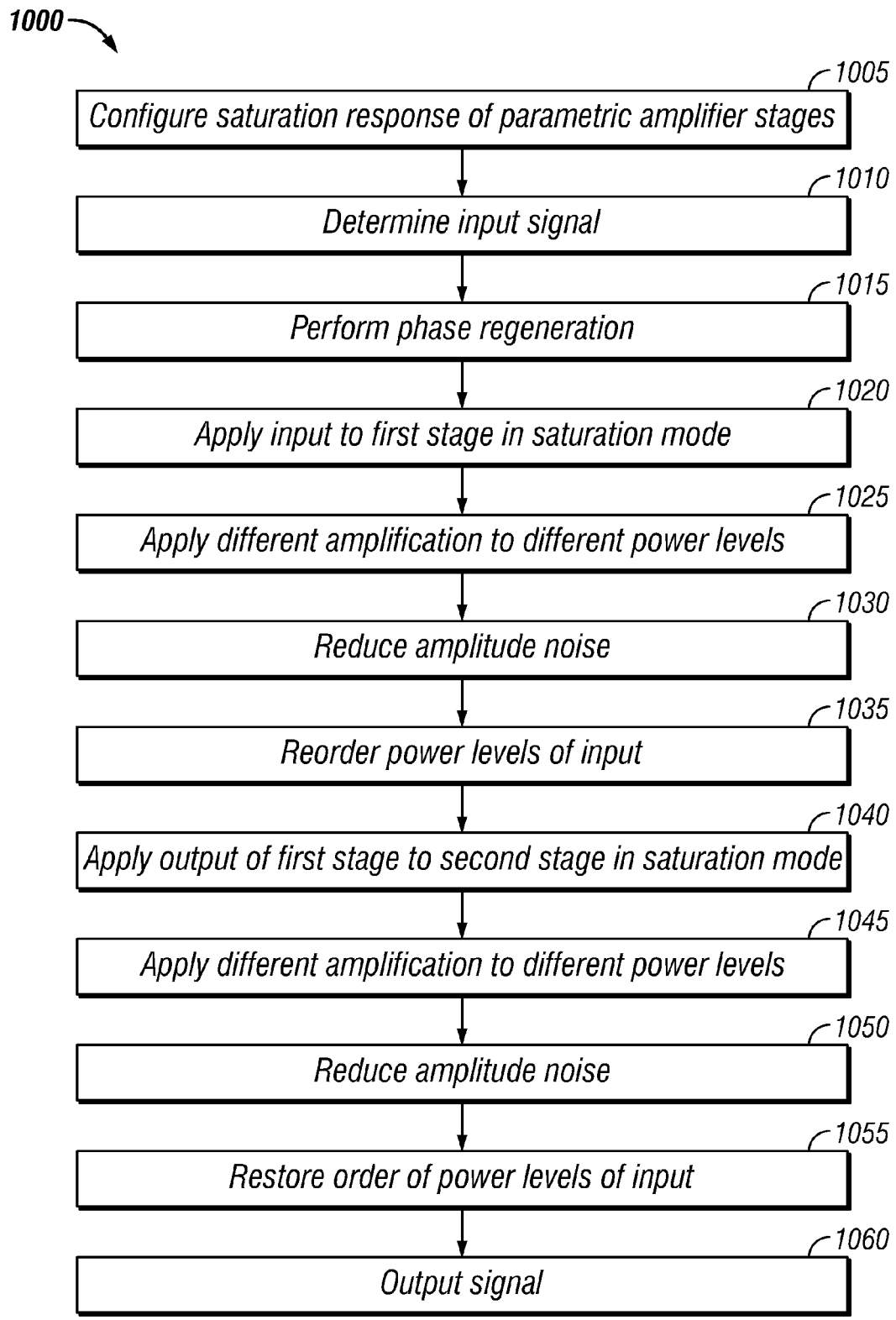
FIG. 10 is an illustration of an example method for amplitude noise squeezing.

FIG. 10 is an illustration of an example method 1000 for amplitude noise squeezing. Method 1000 may be performed by, for example, amplifier 200.

At 1005, saturation response of parametric amplifier stages may be determined and configured. The response of each stage may be configured such that the saturation response is roughly linear and negatively sloped. Furthermore, the response of each stage may be configured such that, after passing the input of all the cascaded stages, the output may include power levels that are equivalent to the input. The configuration of the saturation response may be made by determining a power level and bandwidth spacing of a pump signal to be added to the inputs to the stages. The power level of a given stage may be selected to match or nearly match the input signals.

At 1010, the input signal may be determined and received. If necessary, the amplitude of the signal may be adjusted for subsequent steps of amplification and regeneration. At 1015, phase regeneration may be performed. Such regeneration may be applied to reduce phase noise on the input signal. The phase regeneration may introduce additional amplitude noise to the input signal. If necessary, the amplitude of the signal may be adjusted for subsequent steps of amplification and regeneration.

At 1020, the input may be applied to a first stage operating in saturation mode. The saturation mode may specify a non-constant, negatively sloping amplitude to the input signal based upon the power of the signal. Thus, at 1025, different amplification values may be applied to different power levels of the signal. Amplification may be performed in any suitable manner. For example, a pump signal nearly equal to the power of the input signal may be coupled to the input signal, and the result passed through an HNLF. The result may be filtered to remove any components remaining from the pump signal. At 1030, amplitude noise may be reduced or squeezed. Such a reduction may be the result of the amplification. At 1035, the power levels of the input may have been reordered. Such a reordering may be the result of applying different amplification values to different power levels of the signal. If necessary, the amplitude of the signal may be adjusted for subsequent steps of amplification and regeneration.

At 1040, the output of the first stage may be applied to a second stage operating in saturation mode. At 1045, different amplification values may be applied to different power levels of the signal. Amplification may be performed in any suitable manner. At 1050, amplitude noise may be reduced or squeezed. Such a reduction may be the result of the amplification. At 1055, the power levels of the input may have been restored to the equivalents as determined in 1010. Such a restoration may be the result of applying different amplification values to different power levels of the signal. Furthermore, such a restoration may undo the actions performed in 1035.

At 1060, the resulting signal may be output.

Method 1000 may be implemented using the system and optical amplifiers of FIGS. 1-9, or any other system or device operable to implement method 1000. As such, the preferred initialization point for method 1000 and the order of the steps comprising method 1000 may depend on the implementation chosen. In some embodiments, some steps may be optionally omitted, repeated, or combined. In certain embodiments, method 1000 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as other tangible, non-transitory media; and/or any combination of the foregoing.

Although the present invention has been described with several embodiments, various changes and modifications may be suggested to one skilled in the art. It is intended that the present invention encompass such changes and modifications as fall within the scope of the appended claims.

What is claimed is:

1. A system for regenerating optical signals, comprising:
an input configured to accept a source amplitude-modulated optical signal comprising a plurality of input power modulation levels, each input power modulation level indicating information carried on the source amplitude-modulated optical signal;
a regenerator communicatively coupled to the input and configured to regenerate the source amplitude-modulated optical signal to produce an output optical signal, the regenerator comprising:
a first stage comprising an optical parametric amplifier configured to:
apply a first saturation mode response to the source amplitude-modulated optical signal, the first saturation mode response includes applying an increasingly negative gain in response to an increase in power of the source amplitude-modulated optical signal; and
produce a first stage output; and
a second stage communicatively coupled in cascaded fashion to the first stage and comprising an optical parametric amplifier configured to:
apply a second saturation mode response to the first stage output; and
produce a second stage output;
wherein:
the output optical signal includes a plurality of output power modulation levels including information equivalent to information of the input power modulation levels.

2. The system of claim 1, wherein a power level spectrum of the first saturation mode response includes the input power modulation levels.

3. The system of claim 1, wherein:
the first stage output includes intermediate power modulation levels corresponding to the application of the first saturation mode response to the input power modulation levels; and
a power level spectrum of the second saturation mode response includes the intermediate power modulation levels.

4. The system of claim 1, wherein:
the regenerator further comprises a third stage communicatively coupled in cascaded fashion to the second stage and comprising an optical parametric amplifier configured to:
apply a third saturation mode response to the second stage output; and
produce a third stage output.

5. The system of claim 1, wherein the first stage includes:
a coupler configured to couple a pump source and the source amplitude-modulated optical signal; and
a nonlinear optical element communicatively coupled to the output of the coupler and configured to regenerate the source amplitude-modulated optical signal.

6. The system of claim 5, wherein the first saturation mode response is based upon a power of the pump source.

7. The system of claim 5, wherein the first saturation mode response is based upon a bandwidth spacing of the pump source.

8. The system of claim 1, wherein:
the first stage output includes reduced amplitude modulation noise compared to the source amplitude-modulated optical signal; and
the second stage output includes reduced amplitude modulation noise compared to the first stage output.

9. The system of claim 1, wherein:
the input power modulation levels include an ordering of the input power modulation levels from lowest power to highest power;
the first stage output includes a plurality of first stage power modulation levels with an ordering of the first stage power modulation levels from lowest power to highest power;
the second stage output includes a plurality of second stage power modulation levels with an ordering of the second stage power modulation levels from lowest power to highest power;
the ordering of the first stage power modulation levels is different from the ordering of the input power modulation levels; and
the ordering of the second stage power modulation levels is different from the ordering of the first stage power modulation levels.

10. A method for regenerating optical signals, comprising:
determining an input including a source amplitude-modulated optical signal comprising a plurality of input power modulation levels, each input power modulation level indicating information carried on the source amplitude-modulated optical signal;
applying the source amplitude-modulated optical signal to a first optical parametric amplifier configured to optically apply a first saturation mode response to the source amplitude-modulated optical signal, yielding a first stage output, the first saturation mode response includes applying an increasingly negative gain in response to an increase in power of the source amplitude-modulated optical signal;

applying the first stage output to a second optical parametric amplifier configured to optically apply a second saturation mode response to the first stage output, yielding a second stage output; and producing an output optical signal based upon the second stage output and including a plurality of output power modulation levels including information equivalent to information of the input power modulation levels.

11. The method of claim 10, wherein a power level spectrum of the first saturation mode response includes the input power modulation levels.

12. The method of claim 10, wherein:
the first stage output includes intermediate power modulation levels corresponding to the application of the first saturation mode response to the input power modulation levels; and
a power level spectrum of the second saturation mode response includes the intermediate power modulation levels.

13. The method of claim 10, further comprising:
applying the second stage output to a third optical parametric amplifier configured to optically apply a third saturation mode response to the first stage output, yielding a third stage output; and
producing the output optical signal based upon the third stage output and including a plurality of output power modulation levels including information equivalent to information of the input power modulation levels.

14. The method of claim 10, wherein applying the source amplitude-modulated optical signal to a first optical parametric amplifier includes coupling a pump source to the source amplitude-modulated optical signal and sending the result through a nonlinear optical element configured to regenerate the source amplitude-modulated optical signal.

15. The method of claim 14, wherein the first saturation mode response is based upon a power of the pump source.

16. The method of claim 14, wherein the first saturation mode response is based upon a bandwidth spacing of the pump source.

17. The method of claim 10, wherein:
the first stage output includes reduced amplitude modulation noise compared to the source amplitude-modulated optical signal; and
the second stage output includes reduced amplitude modulation noise compared to the first stage output.

18. The method of claim 10, wherein:
the input power modulation levels include an ordering of the input power modulation levels from lowest power to highest power;
the first stage output includes a plurality of first stage power modulation levels with an ordering of the first stage power modulation levels from lowest power to highest power;
the second stage output includes a plurality of second stage power modulation levels with an ordering of the second stage power modulation levels from lowest power to highest power;

the ordering of the first stage power modulation levels is different from the ordering of the input power modulation levels; and
the ordering of the second stage power modulation levels is different from the ordering of the first stage power modulation levels.

19. A method for regenerating optical signals, comprising:
determining an input including a source amplitude-modulated optical signal comprising a plurality of input power modulation levels, each input power modulation level indicating information carried on the source amplitude-modulated optical signal;
regenerating, using a successive plurality of saturation modes of amplification, the source amplitude-modulated optical signal; and
producing an output optical signal from the regeneration, the output optical signal including a plurality of output power modulation levels including information equivalent to information of the input power modulation levels, wherein
the successive plurality of saturation modes of amplification includes:
a first saturation mode configured to reorder the power modulation levels; and
a second saturation mode, applied after the first saturation mode, configured to restore an order of the power modulation levels.

20. The method of claim 19, further comprising applying phase regeneration to the input signal, causing an increase in amplitude noise, wherein:
the regeneration of the source amplitude-modulated optical signal includes reduction of the increase in amplitude noise.

21. A method for regenerating optical signals, comprising:
determining an input including a source amplitude-modulated optical signal comprising a plurality of input power modulation levels, each input power modulation level indicating information carried on the source amplitude-modulated optical signal;
regenerating, using a successive plurality of saturation modes of amplification, the source amplitude-modulated optical signal; and
producing an output optical signal from the regeneration, the output optical signal including a plurality of output power modulation levels including information equivalent to information of the input power modulation levels, wherein
the successive plurality of saturation modes of amplification includes:
a first saturation mode configured to amplify different ones of the power modulation levels with different gains; and
a second saturation mode configured to reverse the operation of the first saturation mode.

22. The method of claim 21, further comprising applying phase regeneration to the input signal, causing an increase in amplitude noise, wherein:
the regeneration of the source amplitude-modulated optical signal includes reduction of the increase in amplitude noise.

* * * * *